United States Patent
Reeves et al.

(10) Patent No.: US 11,985,507 B2
(45) Date of Patent: May 14, 2024

(54) SUBSCRIBER IDENTIFICATION MODULE (SIM) AUTHENTICATION PROTECTIONS

(71) Applicant: T-Mobile Innovations LLC, Overland Park, KS (US)

(72) Inventors: Raymond Reeves, Oviedo, FL (US); Simon Youngs, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/324,837

(22) Filed: May 26, 2023

(65) Prior Publication Data
US 2023/0300621 A1     Sep. 21, 2023

Related U.S. Application Data

(62) Division of application No. 17/725,487, filed on Apr. 20, 2022, now Pat. No. 11,706,629, which is a
(Continued)

(51) Int. Cl.
*H04W 12/67* (2021.01)
*H04L 9/32* (2006.01)
(Continued)

(52) U.S. Cl.
CPC ........... *H04W 12/67* (2021.01); *H04L 9/3231* (2013.01); *H04W 12/03* (2021.01); *H04W 12/06* (2013.01);
(Continued)

(58) Field of Classification Search
None
See application file for complete search history.

(56) References Cited

U.S. PATENT DOCUMENTS

| 8,463,239 B1 | 6/2013 | Koller et al. |
| 8,467,770 B1 | 6/2013 | Ben Ayed |

(Continued)

FOREIGN PATENT DOCUMENTS

| WO | 20160050990 A1 | 4/2016 | |
| WO | WO-2016050990 A1 * | 4/2016 | ............. H04L 63/08 |

OTHER PUBLICATIONS

Restriction Requirement dated Dec. 9, 2021 U.S. Appl. No. 17/081,813, filed Oct. 27, 2020.
(Continued)

*Primary Examiner* — Sanchit K Sarker

(57) ABSTRACT

A method of computer authentication of a user request for a Subscriber Identity Module (SIM) card transfer by a biometric signature from a user equipment (UE) comprising assigning a risk score, by a mobile service provider, to a user account based on user activity in the user account, wherein the user activity includes a SIM card transfer authorization. The mobile service provider then sends a message requesting a biometric signature from an authentication application executing in memory on the UE. The authentication application on the UE then proceeds capturing a biometric signature, encrypting the biometric signature, and sending an encrypted biometric signature to the mobile service provider using a wireless communication protocol. The mobile service provider then compares the biometric signature to an authorized signature and modifies the risk score based on the comparison.

18 Claims, 12 Drawing Sheets

Related U.S. Application Data division of application No. 17/081,813, filed on Oct. 27, 2020, now Pat. No. 11,368,849.

(51) Int. Cl.
  *H04W 12/03* (2021.01)
  *H04W 12/06* (2021.01)
  *H04W 12/128* (2021.01)
  *H04W 12/72* (2021.01)

(52) U.S. Cl.
  CPC ......... *H04W 12/128* (2021.01); *H04W 12/72* (2021.01); *H04L 2209/80* (2013.01)

(56) References Cited

U.S. PATENT DOCUMENTS

| | | | |
|---|---|---|---|
| 10,530,756 | B1 | 1/2020 | Youngs |
| 11,076,629 | B2 | 8/2021 | Kunes et al. |
| 11,368,849 | B1 | 6/2022 | Reeves et al. |
| 2005/0063570 | A1* | 3/2005 | Kim ................. G07C 9/247 |
| | | | 382/119 |
| 2008/0312968 | A1* | 12/2008 | Hannon ................ H04M 17/00 |
| | | | 705/40 |
| 2009/0007275 | A1* | 1/2009 | Gehrmann ............. G06F 21/71 |
| | | | 713/189 |
| 2016/0021532 | A1 | 1/2016 | Schenk et al. |
| 2016/0307199 | A1* | 10/2016 | Patel .................. G06Q 20/4016 |
| 2017/0208540 | A1 | 7/2017 | Egner et al. |
| 2017/0272972 | A1* | 9/2017 | Egner ................. H04L 47/2441 |
| 2018/0302227 | A1 | 10/2018 | Seegebarth |
| 2021/0165426 | A1 | 6/2021 | White |
| 2022/0012743 | A1* | 1/2022 | Snell .................... G06Q 20/322 |
| 2022/0248233 | A1 | 8/2022 | Reeves et al. |

OTHER PUBLICATIONS

Notice of Allowance dated Feb. 24, 2022, U.S. Appl. No. 17/081,813, filed Oct. 27, 2020.
Restriction Requirement dated Oct. 11, 2022 U.S. Appl. No. 17/725,487, filed Apr. 20, 2022.
Office Action dated Dec. 16, 2022 U.S. Appl. No. 17/725,487, filed Apr. 20, 2022.
Notice of Allowance dated Mar. 2, 2023 U.S. Appl. No. 17/725,487, filed Apr. 20, 2022.

* cited by examiner

SUBSCRIBER IDENTIFICATION MODULE (SIM) AUTHENTICATION PROTECTIONS

CROSS-REFERENCE TO RELATED APPLICATIONS

This application is a divisional of and claims priority under 35 U.S.C. § 120 to U.S. patent application Ser. No. 17/725,487, filed on Apr. 20, 2022, entitled "Subscriber Identification Module (SIM) Authentication Protections," by Raymond Reeves, et al., which is a divisional of and claims priority under 35 U.S.C. § 120 to U.S. patent application Ser. No. 17/081,813, filed on Oct. 27, 2020, entitled "Subscriber Identification Module (SIM) Authentication Protections," by Raymond Reeves, et al., now U.S. Pat. No. 11,368,849 issued Jun. 21, 2022, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are used for communication, connection, organization, information, and entertainment. These devices allow the users to call and text message friends and family, organize their day, read email, browse the internet, and play games. Users can access retailers, banking, and consumer services through a website or application on the mobile device. Many of these companies use the mobile devices to authenticate a user's identity to gain access to an account.

Financial institutions can utilize a multi-factor authentication process to authenticate a user's identity with the mobile device. For example, a simple messaging service (SMS) message can be sent to the mobile device with a one-time password. The user can be required to enter the password on the website or in the application. A financial institution can also verify a transaction or account change with an SMS message. For example, a mobile transaction authentication number (mTAN) are used to authenticate a user's request for a financial banking transaction.

A Subscriber Identity Module (SIM) card is an integrated circuit that is intended to securely store the international mobile subscriber identity (IMSI) number and its related key, which are used to identify and authenticate a mobile communication device for attachment to a radio access network (RAN), for example to receive a wireless link from a cell site. Typically, a SIM card is an embedded semiconductor molded into a plastic card made of PVC. The embedded semiconductor circuit is part of a universal integrated circuit card (UICC) physical smart card that contains a unique serial number, Integrated Circuit Card Identifier (ICCID), IMSI, and other security information associated with the mobile service provider. The SIM may also be an embedded-SIM (eSIM) or embedded universal integrated circuit card (eUICC) that is embedded directly into a mobile communication device. The International Mobile Equipment Identity (IMEI) number is a unique identification that all mobile devices have. Typically, a SIM card is activated by the mobile service provider with a registration process that is initiated by a retail location, over the phone, or on a website. The mobile service provider then uses the SIM card to associate the IMEI number of the device to the subscriber and authorize use on the network.

SUMMARY

In an embodiment, a method provisioning a Subscriber Identity Module (SIM) swap is disclosed. The method comprises receiving, by a mobile service provider, a request from a user to disconnect a first user equipment (UE) having a first SIM card from a wireless service of the mobile service provider and to connect a second UE having a second SIM card to the wireless service of the mobile service provider, wherein the first and second SIM cards are associated with an account of the user. The mobile service provider continues switching wireless service to a limited wireless service, by the mobile service provider, to the first UE. The mobile phone provider continues by assigning a risk factor to the account of the user and sending a confirmation message to the first UE. The method further comprises modifying the risk factor, by the mobile service provider, assigned to the account of the user based on a response received from the first UE to the confirmation message.

In another embodiment, a method of assigning a risk score for user authentication by a UE is disclosed. The method comprises assigning a risk score, by a mobile service provider, to a user account based on risk behaviors ratings in the user account, wherein the risk behavior ratings are determined by a user activity log, a device history, a purchase history, and a location history of the UE, wherein the user activity includes a SIM card authorization. The mobile service provider continues by modifying the risk score with a time weighted risk factor. The time weighted risk factor is a risk factor that decreases over a time period by a rate of decrease. The time period is measured in any combination of seconds, minutes, hours, and days, and the rate of decrease is any combination of a linear rate, a log rhythmic rate, or an exponential rate. The mobile service provider continues the method by writing the risk score to the user account. The method further comprises receiving a request from a third party, by the mobile service provider, for the risk score on the user account, and providing the risk score to the third party.

In yet another embodiment, a method for computer authentication of a user request for a Subscriber Identity Module (SIM) card transfer by a biometric signature from a user equipment (UE) is disclosed. The mobile service provider assigns a risk score to a user account based on user activity in the user account. The user activity, in the user account, includes a SIM card authorization. The mobile service provider continues the method by requesting a biometric signature from an authentication application executing in memory on the UE, capturing a biometric signature, encrypting the biometric signature, and sending an encrypted biometric signature to the mobile service provider by a wireless communication protocol. The mobile service provider continues the method by comparing the biometric signature to an authorized signature, and modifying the risk score based on the comparison.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
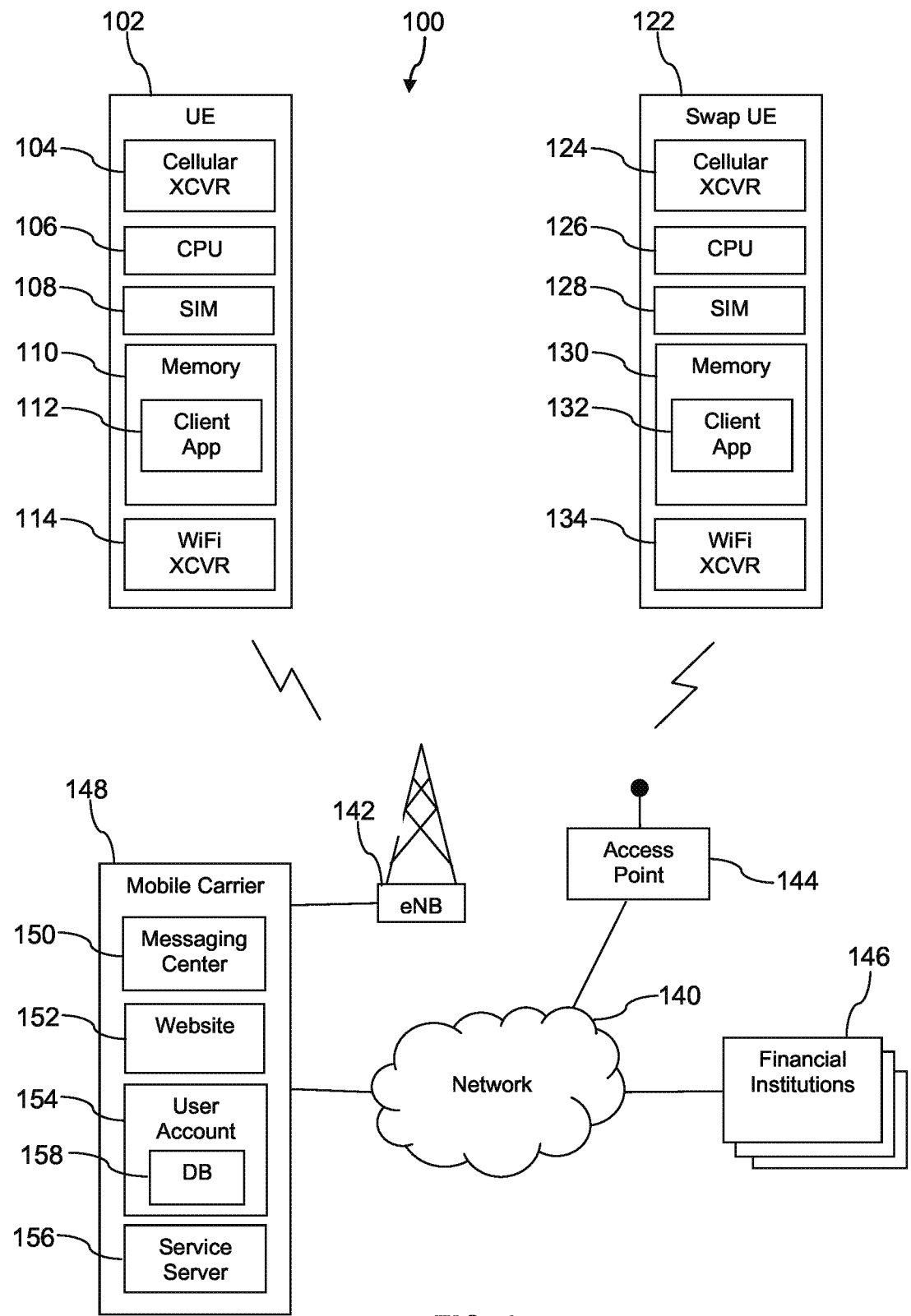
- FIG. 1 is a block diagram of a communication system according to an embodiment of the disclosure.

It should be understood at the outset that although illustrative implementations of one or more embodiments are illustrated below, the disclosed systems and methods can be implemented using any number of techniques, whether currently known or not yet in existence. The disclosure should in no way be limited to the illustrative implementations, drawings, and techniques illustrated below, but can be modified within the scope of the appended claims along with their full scope of equivalents.

A user can need to request a SIM swap for several valid reasons. A user can request a SIM swap when upgrading a phone or changing mobile service provider. For example, a user can upgrade a phone that uses a different shape SIM card than the original phone. Another example is a requirement from a new mobile service provider for a SIM card provided by their network (e.g., a prepaid phone service for international travel.). The user can purchase a replacement phone for a phone that has been lost, damaged, or malfunctioning (e.g., a diminished battery life.) The user can initiate the SIM swap process at a retail store, over the phone with a customer service representative, or online through a self-service web site.

Unfortunately, by making these services convenient to the user has opened the door for criminal exploitation. Criminals use these services as opportunities to circumvent the multi-factor authentication process, for example, by taking control of a user's phone using a SIM swap. A fraudulent SIM swap typically begins with identity theft of the user including the login and passwords for the wireless service provider self-service website. A hacker might obtain a user's online identity (e.g., name, address, phone number, passwords, etc.) through social engineering, weak passwords, or purchasing the user identity off the dark web. To obtain access to a user's account, hackers can use a SIM swap to intercept two-step verification (i.e., calls and text messages) from the financial institutions intended to verify a user's identification. The SIM swap begins with the hacker impersonating the user by logging onto the wireless service provider self-service website and requesting a SIM card associated with the user's account be assigned to a new phone. The mobile service provider self-service website typically processes the request within minutes. After the SIM card associated with the user's account has been assigned to the hacker's phone, the hacker can request new email addresses and passwords from the user's financial institutions. The hacker then intercepts the emails or text messages that include the temporary verification passwords sent from the user's financial institution. With the new password, the hacker can then have access to bank accounts and transfer funds out of those accounts or conduct other transactions.

Mobile service providers have developed a customer friendly process to activate a new phone with a SIM swap. The user can request new phone activation by accessing the user account on a self-service website, a mobile application, or during a new phone set up process. By accessing the user account, the mobile service providers can register the new phone onto the user account with only the login credentials. A new phone can be registered onto the user's account in a relatively short amount of time. However, by providing a convenient service, mobile service providers have provided a security gap that can be exploited by fraudulent actors (i.e., criminals). Many financial institutions rely on two-step authentication for user identity verification. The first step (also called factor) is the login credentials to the user's account. The second step is the possession of a mobile device registered to the user. The financial institution typically sends a code by text message to the mobile device. A fraudulent actor can pose as a user to access the user's financial account by registering a phone in the user's name such as with a SIM swap. The user's account can then be accessed by the fraudulent actor by using a SIM swap phone to pose as the user for two-step authentication.

One solution to closing the security gap created by the convenient SIM swap process is by assigning a risk score to the user's account based on the activity in the user's account. The risk score can provide a gauge to evaluate if a SIM swap is legitimate or should be reversed. In an embodiment, a mobile service provider assigns a risk score to the user's account based on activity in the account (e.g., SIM swap request). The risk rating can be raised based on user behavior such as the location of the user's device. The mobile service provider can complete the SIM swap then authenticate the user's identity on the old device by providing a temporary subscription to the network. The authentication of the user's identity on the old device can lower the risk rating. The mobile service provider can apply a temporary subscription to the old device to establish a connection to the network. The mobile service provider can then send a simple messaging service (SMS) message to the old device to query if the SIM swap is authorized. In some situations, a customer service representative can call the old device to speak with the user. The mobile service provider can rank the SIM swap with a low risk rating, medium risk rating, or a high risk rating based on the feedback. For example, the mobile service provider can rank the swap as low risk if the user confirms the swap on the deactivated device. The mobile provider can rank the SIM swap as medium if no reply from the deactivated device is received. The mobile provider can rank the SIM swap as high risk if the user alerts the mobile provider that the swap is unauthorized. If the SIM swap is unauthorized, the mobile provider can deny the SIM swap or can reactivate the deactivated device, terminate the subscription to the new device, and freeze the user account. The temporary subscription provided by the mobile provider can be restricted in operation to only one type of text message service (e.g., SMS, SMS over Internet Protocol (SMS-IP), or Rich Communication Service (RCS)) and can limit the voice service to calls to the service center of the mobile carrier. The temporary subscription can have a limited amount of time to be active. The temporary subscription can terminate after a reply is received from the terminated device and the SIM swap is completed. The risk score and temporary subscription can provide a solution to the security gap created by a convenient SIM swap process.

Another solution to closing the security gap created by the convenient SIM swap process is by requesting a biometric signature. In an embodiment, a mobile carrier can authenticate the identity of a user when a SIM swap is requested with a biometric signature from the new device. A mobile carrier can utilize SMS-IP messaging, RCS messaging, or messaging within a provider application to communicate a biometric signature from the user device to the mobile carrier. For example, the mobile carrier can ask the user to send a selfie by one of the text messaging protocols after completing the SIM swap on a new device. The biometric signature can be an image of a user's face (i.e., a selfie), a part of a user's face (i.e., nose, chin, right eye, etc.), or another part of a user's body (i.e., left hand, right hand, left foot, right foot, etc.). The mobile carrier can grade the risk factor based on selecting the correct selfie location (i.e., left hand) in addition to the comparison of the image sent to the image on file. The mobile carrier can assign a low risk factor for matching the image sent to the image on file. The mobile carrier can assign a medium factor for a low match comparison or if the user does not respond to the request. The mobile carrier can assign a high risk factor for a low match comparison or not matching the image on file.

In an embodiment, a mobile carrier can provide a risk factor to financial institutions for user authentication by a mobile device based on the user activity within the user account. The mobile carrier can assign a high, medium, and low risk factor to a user account for activity that can involving the user's identity such as SIM card swap, change of user login credentials, and change of user profile. For example, the mobile carrier may assign a high risk factor to a user's account for a SIM card swap and a change of user login credentials. The mobile carrier can provide a subscription based application programming interface (API) for a financial institution to access the risk factor for user authentication by text message. For example, the mobile carrier can record a high risk for a user's account accessible via the API. A financial institution can then query the API when a user creates a transaction or account change that requires a user identity verification. Based on the risk factor, the financial institution can request user identification by a second method, proceed with the request, or deny the user request. For example, the financial institution may query the API when a user requests to change the user login credentials. The financial institution can determine a high risk of fraud based on the type of user request and the risk rating associated with the user's account on the API. The financial institution can freeze the account or negate any transactions while investigating the recent changes.

In an embodiment, a mobile carrier can provide a subscription to an API for a financial institution to utilize a biometric signature to validate user identity for requests. The financial institution can utilize an application on a user's device to take a photograph, encrypt the photograph, and route the photograph to the API for validation. The action of photographing the user with the application can prevent substitution of another photograph. The application can establish a connection to the API by exchanging passwords. The application can transmit the encrypted photograph and receive a risk rating based on the comparison of the encrypted photograph to the image on file. In an embodiment, the application on the user's device can transmit the location data of the user device along with the photograph and receive a risk factor based on both photograph and location data. For example, a high risk rating might be assigned where the location data indicates the mobile device is located in a country or state different than the user's country or state.

Turning now to FIG. 1, a mobile communication system 100 is described. In an embodiment, the system 100 comprises a first mobile communication device (user equipment—UE) 102, a second mobile communication device (swap UE) 122, a cell site 142, an access point 144, a mobile carrier network 148, financial institutions 146, a database 158, and a network 140. A UE 102 may be a cell phone, a mobile phone, a smartphone, a personal digital assistant (PDA), an Internet of things (IoT) device, a wearable computer, a headset computer, a laptop computer, a tablet computer, or a notebook computer. Hackers may attempt a SIM swap on the swap UE 122. The swap UE 122 may be a cell phone, a mobile phone, a smartphone, a personal digital assistant (PDA), an Internet of things (IoT) device, a wearable computer, a headset computer, a laptop computer, a tablet computer, or a notebook computer. The network 140 may be one or more private networks, one or more public networks, or a combination thereof. The cell site 142 provides wireless communication links to the UE 102 and swap UE 122 according to a 5G, a long term evolution (LTE), a code division multiple access (CDMA), or a global system for mobile communications (GSM) wireless telecommunication protocol.

The UE 102 may establish a wireless link with the mobile carrier network 148 with a long-range radio transceiver 104 to receive data and voice communications. The UE 102 may also include a processor 106, a SIM card 108, a memory 110, one or more client applications 112, and a short-range radio transceiver 114. The UE 102 may include a display, a touchscreen display having a touch-sensitive surface for input by a user, a keyboard for input by a user, or a microphone for audio input by a user. The short-range radio transceiver 114 may establish wireless communication with Bluetooth, WiFi, or other low power wireless signals such as: ZigBee, Z-Wave, 6LoWPan, Thread, and WiFi-ah. The long-range radio transceiver 104 may be able to establish wireless communication with the cell site 142 based on a 5G, LTE, CDMA, or GSM telecommunications protocol. The UE 102 may be able to support two or more different wireless telecommunication protocols and, accordingly, may be referred to in some contexts as a multi-protocol device. The UE 102 may communicate with another UE via the wireless link provided by the cell site 142 and via wired links provided by the network 140.

The swap UE 122 may be similar in function to the UE 102. The swap UE 122 may include a long-range radio transceiver 124, a processor 126, a SIM card 128, a memory 130, one or more client applications 132, and a short-range radio transceiver 134. The swap UE 122 may be similar in appearance with a display, a touchscreen display having a touch-sensitive surface for input by a user, a keyboard for input by a user, or a microphone for audio input by a user.

The short-range radio transceiver 134 may establish wireless communication with an access point 144. The long-range radio transceiver 124 may be able to establish wireless communication with the cell site 142. The swap UE 122 may be able to support two or more different wireless telecommunication protocols and, accordingly, may be referred to in some contexts as a multi-protocol device. The swap UE 122 may communicate with another UE via the wireless link provided by the cell site 142 and via wired links provided by the network 140.

A short-range access point (AP) 144 may provide a wireless communication link via the short-range radio transceiver 114 to the UE 102 and thereby communicatively couple the UE 102 to the mobile carrier network 148 via the network 140. In some circumstances, it may be desirable for the UE 102 to complete data and/or voice calls via the AP 144 rather than via the cell site 142, for example, to reduce tolling of data usage of a limited data communication service subscription plan and to reduce loading on a cellular infrastructure. Wireless communication between the swap UE 122 and AP 144 may be similarly established.

The mobile carrier network 148 comprises a text message service center 150, self-service website 152, user account server 154, and a mobile service server 156. The mobile carrier network 148 may connect and transmit voice calls and data communications through a circuit-switched network. The mobile carrier network 148 may connect and transmit data and voice through a data network. The data network may be an IP multimedia Core Network Subsystem (IMS) that sends and receives digital data utilizing IP packet switching, such as the global standard IP protocol. The IMS subsystem may deliver voice (e.g., Voice over IP (VoIP) and WiFi Calling (VoWIFI)), messaging (e.g., RCS), and multimedia (e.g., video and audio clips) using IP packet-switched network. The mobile carrier network 148 may utilize a combination of both the data and circuit-switched networks. The self-service website 152 may be an application executing on a server within or connected to the mobile carrier network 148. The self-service website 152 may require a user name and user password to log in and request changes to the user's subscription, associate devices, and mobile services on the user account server 154. The user account server 154 may control user access to the mobile network based on the subscription and services the user requested. User account server 154 may maintain the data that associates the SIM card 108 on the UE 102 to the subscription provided by mobile carrier network 148. The mobile service server 156 may grant UE 102 access to cell site 142 via the mobile carrier network 148 based on the SIM card 108 registered on the user account server 154 and the IMEI number associated with the user device, such as UE 102. The text message service center 150 may provide various text messaging services including SMS, SMS-IP, RCS, and others.

The mobile carrier network 142 can collect various usage data of the UE 102 and swap UE 122. The usage data can include device history, purchase history, and location history. The device history can include usage data, diagnostic data, service data, service requests, and a customer service history along with the date and time of each record. For example, the diagnostic data can include battery life data, recorded over a period of time, indicative of a battery failure. The diagnostic data can also include moisture sensor data indicating the device has water damage along with when the damage occurred. The service data and service requests can include records of repair requests and technical issues made by the user. The device history can include requested SIM activation and SIM deactivation. The customer service history can include a record of contact with customer service to report of a stolen or lost phone and when the contact was made. The purchase history can include date of sale, date of shipment, and date of receipt of the UE 102 and the swap UE 122. The location history of the UE 102 and swap UE 122 can include the location of the device over a time period of minutes, hours, days, weeks, months, or years. The location data can be determined from GPS data, a connection to one or more access nodes 142, a connection to one or more AP 144, or any combination thereof. The data collected by the mobile carrier network 142 can be linked to the user's account and saved in a database on the user account server 154.

Financial institution 146 connected to the network 140 may provide financial services to customers, such as the user of UE 102. Financial institutions 146 may include websites, databases, and so on for maintaining the customer financial data, such as personal bank accounts, and providing customer access to their accounts. In an embodiment, financial institution 146 may be a third party 146 such as a bank, an investment company, an insurance company, a company providing any combination of those services, or any other company that processes financial transactions.

In an embodiment, the mobile carrier may assign a risk score when a user requests a SIM card swap. A user may legitimately swap a SIM card when the user replaces UE 102, for example, when upgrading an older model phone for a new phone. The user may utilize the self-service website 152 to initiate the SIM swap by logging in with the proper credentials and passwords to request SIM card 128 of swap UE 122 be associated with the user account and SIM card 108 of UE 102 be disassociated with the user account. The user account server 154 may assign a risk score associated with the user's account in a database 158. A hacker may follow similar steps to hi-jack the SIM of UE 102, using swap UE 122, in order to impersonate the user. The hacker, or criminal type, may access the self-service website 152 to request a SIM swap. The hacker may utilize user credentials obtained through an unsecured user device, weak passwords, or purchasing the user's online identity off the dark web. Once logged into the self-service website, the hacker may request the SIM card 128 of the swap UE 122 be registered with the user's account and SIM card 108 of the UE 102 be deregistered. The user account server 154 may assign a risk score associated with the user's account in a database 158. The registration and deregistration of the SIM cards 128 and 108 may occur over time and in different orders or may occur near simultaneously. The swap UE 122 can have full wireless access, via cell site 142, to the mobile carrier network 148 after registration is complete. The risk score assigned to the user's account by the user account server 154 in the examples above may be used to provide a warning to other third party users utilizing the UE for user authorization. The mobile carrier network 148 can determine a risk score based on the responses given to a message. For example, the mobile carrier network 148 may assign medium risk score (e.g., a 5 on a scale of 1 to 10) to the user's account for requesting the SIM swap. The risk score may be increased to 6 if the user also requests changes to the user login credentials. The mobile carrier network 148 may send a message asking for verification. The risk score may increase to a high risk (e.g., 7 out of 10) as time passes without a reply. The mobile carrier network 148 may modify the risk score to lower risk rating (e.g., 3 out of 10) if the location of the UE 102 is recognized by the user account server 154 or if the location is often associated with the UE 102. The mobile carrier network 148 may modify the risk score lower to the risk rating (e.g., 2 out of 10) if the user requested a replacement UE for a damaged device or malfunctioning device. The mobile carrier network 148 may modify the risk score to high risk (e.g., 10 out of 10) if the location of the swap UE 122 registers as out of the country (e.g., Russia). A high risk score (e.g., 7-10) may cause the mobile carrier network 148 to deny the SIM swap, reverse the SIM swap, lock the user's account, and assign the high risk score to the database 158. The risk score published to the database 158 may provide a risk level to third parties for user authentication with the swap UE 122.

Figure 2:
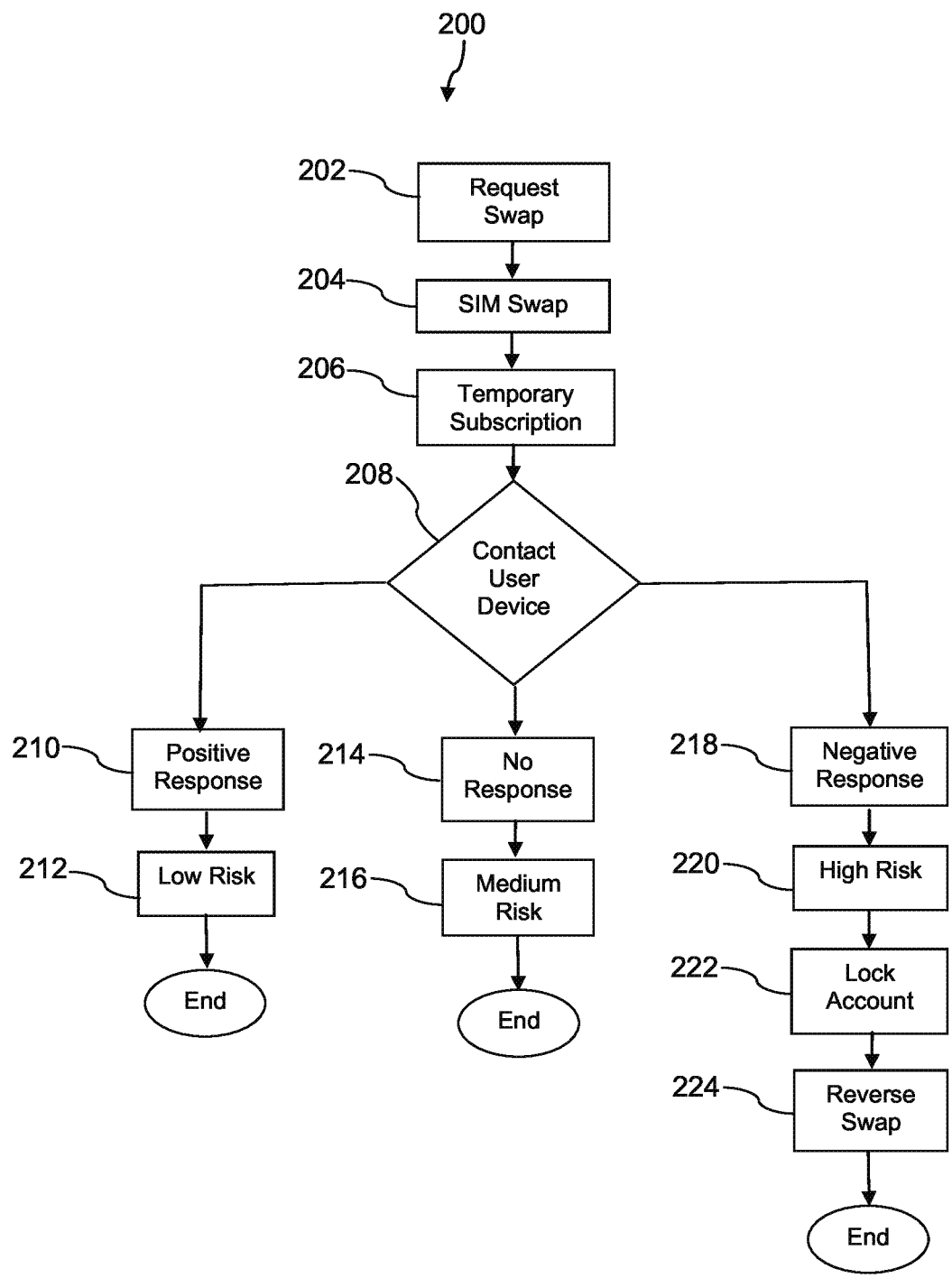
FIG. 2 is a logical flow diagram of a communication system according to another embodiment of the disclosure.

Turning now to FIG. 2 and referring back to FIG. 1, a method 200 of requesting a SIM swap is now described with a logical flow diagram. At step 202, a user may log onto the self-service website 152 of the mobile carrier network 148 to request that the SIM card 128 of the swap UE 122 be registered to the user's account, and SIM card 108 of the UE 102 be deregistered from the user account.

At step 204, the mobile carrier network 148 deregisters the SIM card 108 of the UE 102 from the user account server 154 and registers the SIM card 128 of the swap UE 122 to the user account server 154. The registration and deregistration of the SIM cards 128 and 108 may occur over time and in different orders or may occur near simultaneously. Once the mobile service server 156 completes registration of SIM card 128, including updating the appropriate user account server 154, the swap UE 122 may wireless access, via cell site 142 via, the mobile carrier network 148.

At step 206, the user account server 154 may also provide a temporary subscription to UE 102 to access the mobile carrier network 148. This temporary subscription may not be visible to the user when viewed on the self-service website 152. With the temporary subscription, the user account server 154 may re-register the SIM card 108 of the UE 102 to allow full access or limited access to certain functionality, such as voice calls, text messages, and data communications.

At step 208, the user account server 154 may send a SMS text message via text message service center 150 to the UE 102 device to inquire if the SIM swap was authorized. In other embodiments, other messages or notifications may be sent to the UE 102. The user account server 154 may assign a medium risk rating to the user's account pending a reply to the message sent by the user account server 154. The newly assigned medium risk rating may be a preliminary rating and may be modified up or down depending on risk behaviors ratings. A risk behavior rating can be determined based on user activity within the user account, the location history, the device history, and the purchase history of the UE 102. For example, user activity, such as changing the login credentials, can determine a high risk behavior rating. A change in the location of the UE 102 or the location of the swap UE 122 can determine a high risk behavior rating. For example, the preliminary rating may be increased by a risk behavior rating based on the location history when the location of the swap UE 122 is not a location typically associated with this user. A risk behavior rating based on location history may increase the preliminary rating if mobile carrier network 148 is unable to determine the current location of the UE 102 and swap UE 122. A risk behavior rating may increase the preliminary rating if the location of the UE 102 has not been available for a time period more than a risk behavior time period threshold. A behavior risk based on diagnostic data, such as battery failure or water damage may decrease the preliminary rating. A risk behavior based on service request or service data related to the UE 102 may decrease the preliminary rating. A risk behavior based on customer service history, a report of a lost UE 102, or a report of a stolen UE 102 may increase or decrease the preliminary rating. The preliminary rating may be decreased if the user purchased a replacement UE from the mobile carrier network 148. This assigned risk rating, also called a risk factor, may be changed (e.g., low risk, medium risk, or high risk) based on the risk behavior ratings. The risk factor may be further modified based on the feedback from the user.

In an embodiment, at step 208, the user account server 154 may send a request for a biometric signature from the user with a SMS-IP text message or RCS text message. The requested biometric signature may be a selfie (e.g., an image of the user's face) or an image of a portion of the user's face, for example, the user's eyes, single eye (e.g., the right eye or the left eye) or the user's eyebrows. The biometric signature may include a masked option to the selfie when user is wearing a mask that substantially covers the nose, mouth, and chin. The biometric signature image capture would include the portion of the nose and cheeks above the mask, the eyes and any eyewear, the forehead, and the hairline. Previously saved biometric images of the user with a mask and without a mask to the database 158 on the user account server 154 would be used as signature images for comparison. The user may save multiple signature imagines wearing different types of masks and/or protective eyewear. The requested biometric signature may be a picture of a body part such as a user's fingerprint, thumb print, finger-tip, fingernail, palm print, the user's left hand, or the user's right hand. Previously saved biometric imagines of the body part (e.g., fingerprint, etc.) to the database 158 would be used as signature images for comparison. The text message may prompt opening an application on the UE 102 to take the image, encrypt the image, and transmit the image to the user account server 154. In other embodiments, other authentication information may be requested or other means of authentication may be employed.

At step 210, the user confirms that the SIM swap was authorized on the UE 102 by responding to the SMS text message sent to UE 102. At step 212, the user account server 154 verifies that the information provided in the response matches the information maintained by the user account server 154. For example, a biometric signature submitted by the user substantially matches the biometric signature on file, or the user account server 154 may compare and measure that a selfie received from the user matches an image on file. The user account server 154 may change the medium risk rating assigned at step 208 to a low-risk rating for the SIM swap and terminate the temporary subscription. The low-risk rating may be recorded in the database 158 on the user account server 154.

At step 214, the UE 102 device does not respond to the SMS text message sent by the user account server 154 because the UE 102 device may not be able to respond, such as when the device has been damaged or has malfunctioned. For example, the user may contact the mobile carrier network 148 for a replacement UE 102 when a phone has been lost or damaged. The UE 102 may be replaced by a lease program or replacement insurance offered by the mobile carrier network 148. The mobile carrier network 148 may be aware of damage to a UE 102 based on usage data, diagnostic data, or contact with customer service. In such a case, at step 216, the user account server 154 may continue with the medium risk rating assigned at 208 or may assign a medium risk rating with a higher or lower numerical rating (e.g., 6 or 4) for the SIM swap. The medium risk rating may be recorded in the database 158 on the user account server 154.

At step 218, the user responds negatively on the UE 102 to the SMS text message sent by the user account server 154. For example, a negative response may occur where the user account server 154 receives a selfie image that does not match the selfie image on file. In such a case, at step 220, the user account server 154 may change the medium risk rating from step 208 to a high-risk rating for the SIM swap and the high-risk rating may be recorded in the database 158 on the user account server 154.

At step 222, the user account server 154 may lock the user account, and disable the user account features, preventing the user from logging in to the user self-service website 152. The user may remain locked out of their account until they speak with a customer service representative. In an embodiment, the customer service representative may call the UE 102 device. At step 224, the user account server 154 reverses the SIM swap. For example, the user account server 154 may deregister the SIM card 128 of the swap UE 122 from the user account server 154 and register the SIM card 108 of the UE 102 to the user account server 154. The mobile service server 156 may grant UE 102 full access to the mobile carrier network 148. Deregistration blocks the swap UE 122 from access to the mobile carrier network 148.

In an embodiment, the temporary subscription provided to UE 102 provided by the user account server 154 to access the mobile carrier network 148 may expire after a limited time period. For example, the time period may be measured in any combination of minutes, hours, and days. A medium-risk rating may be recorded in the user account server 154 after the limited time period expires without a response from UE 102. In other embodiments, the temporary subscription may be revoked upon completion of the SIM swap or denial.

Figure 3:
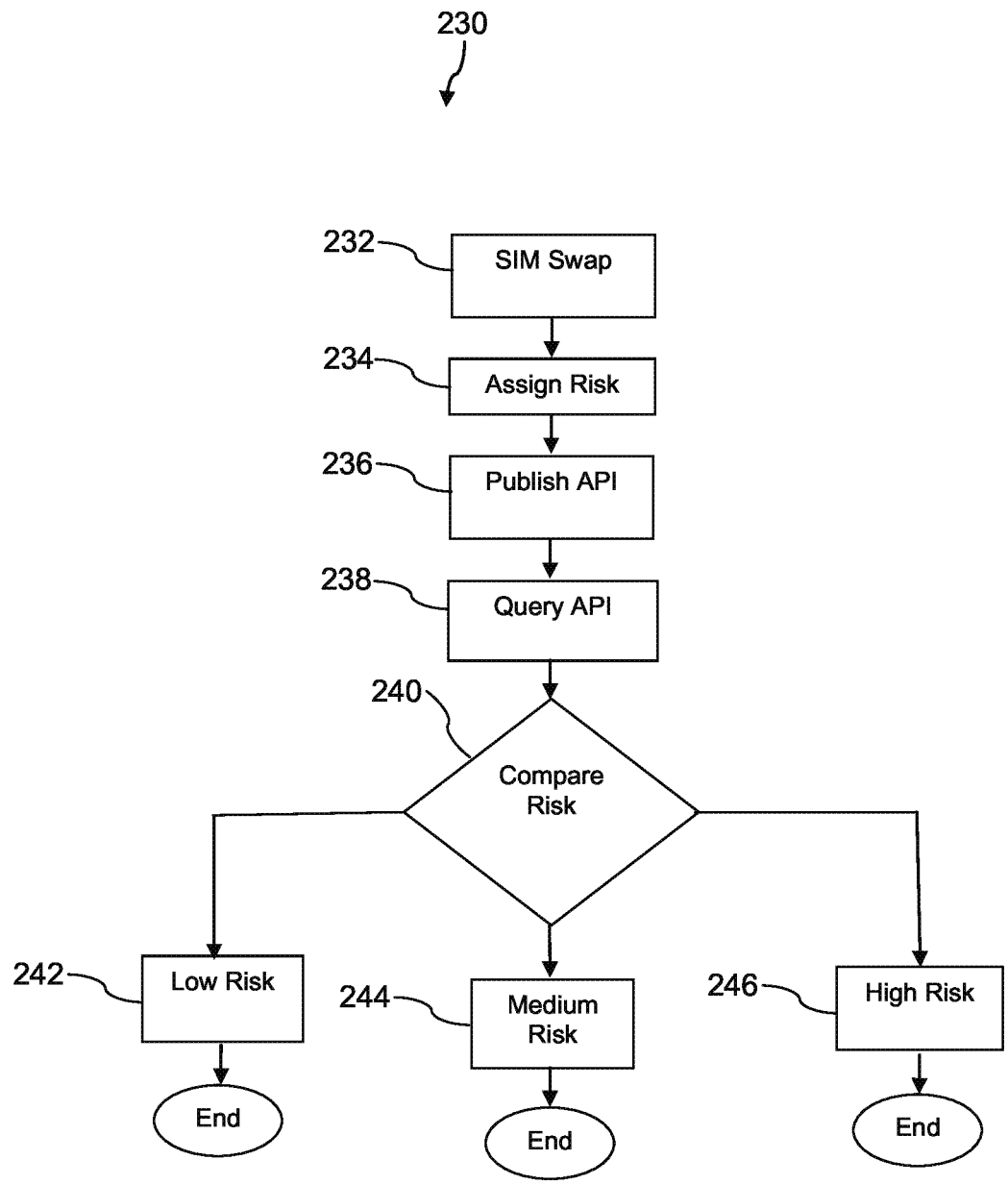
FIG. 3 is a logical flow diagram of a communication system according to a further embodiment of the disclosure.

Turning now to FIG. 3 (with reference to FIG. 1), a method 230 is now described with a logical flow diagram. A mobile carrier network 148 can assign a risk factor for user authentication by a mobile device (e.g., UE 102 or swap UE 122) based on a user's activity, risk behavior ratings, and a time weighted risk factor. Steps 232 and 234 may comprise the SIM swap process, risk assessment, and assignment described with regard to FIG. 2 above. At step 232, a user may log onto a self-service website 152 of a mobile carrier network 148 to request the SIM card 128 of the swap UE 122 be registered to the user's account and SIM card 108 of the UE 102 be deregistered from the user account.

At step 234, the user account server 154 can assign a risk rating for the user's account on the user account server 154 based on risk behavior ratings determined by a location history, a device history, a purchase history, and user activity in the user account. The user account server 154 may assign a time weighted risk factor that initial value is high (e.g., a high risk) and decreases over a time period measured in seconds, minutes, hours, and days. For example, the user account server may assign a time weighted risk factor with a high risk rating when a SIM swap is requested. The weighted risk factor may decrease from a high rating of 10 to a high rating of 8 after a time period such as 4 hours. The time weighted risk factor may decrease from a high risk rating of 8 to a medium risk of 5 after a time period such as 24 hours. The time weighted risk factor may decrease from a medium rating of 5 to a low rating of 3 after 48 hours and may further decrease to a rating of 1 after 7 days. The time weighted risk factor may have an initial rating of 10, 9, 8, 7, 6, or 5 depending on the user activity and risk behavior ratings. The time weighted risk factor may decrease from a high rating (e.g., 8) to a low rating (e.g., 1) over a time period based on the user activity and risk factors. The rate of decrease may follow a mathematical pattern including a linear pattern, a log rhythmic pattern, an exponential pattern, or any similar pattern. The user account server 154 can modify the risk rating assigned to the user's account based on the decreasing value of the time weighted risk factor added to the risk behavior ratings.

At step 236, the user account server 154 enable access to the risk rating assigned to the user's account. The risk ratings data may be stored in database 158. Access to the ratings data may be via APIs that are configured to retrieve the risk ratings from the database 158 on the user account server 154. At step 238, the financial institution 146 retrieves the risk ratings data on a particular user account from database 158, for example, using an API.

At step 240, the financial institution 146 can compare the risk factor to a risk threshold, for example, in response to a customer request that requires user verification. The financial institution 146 may use the risk rating for the particular user, e.g., customer, and use it alone or in conjunction with other authentication employed by the financial institution 146 to determine the authenticity of the user, customer. At step 242, where the risk rating is a low risk, the financial institution 146 may use the user's device to verify the user's identity. At step 244, where the risk rating is medium risk, and the financial institution 146 may request a secondary method (i.e., a call to customer service) to verify the identity of the user. At step 246, where the risk rating is high risk factor, the financial institution 146 may freeze or otherwise prevent access to the user's account, log the user out of the account, and cancel pending transactions, and so on. Further, the financial institution 146 can request the user directly contact the financial institution 146 to verify the user's identity before reenabling the user's account access.

A third party can assign a risk score to a user's third party account, based on activity in the user's third party account. In an embodiment, a third party (e.g., financial institution 146, insurance company, investment company, etc.) can assign a risk factor for user authentication by a mobile device (e.g., UE 102 or swap UE 122) based on user's activity within the user's third party account, risk behavior ratings, and a time weighted risk factor.

The risk behavior ratings may be determined based on data provided by a third party application executing on the UE 102. The third party application may be used to access the accounts of the third party and provided by the third-party. The third party application may log data that is used to determine one or more risk behavior ratings. For example, the location of the UE may be recorded by the third party application. The location data may be determined by accessing the GPS data from the UE, the location of the access node 142, the location of the access point 144 or a combination of all three. A risk behavior rating may be determined from the location history of the UE 102. For example, the user's account may be given a risk behavior rating of high based on the location of the UE 102 being outside of the normal locations associated with the UE 102. A risk behavior rating can be assigned based on the device history. For example, if the third party application is installed onto a new device (e.g., swap UE 122). A risk behavior can be assigned to a user's account based on the user activity within the user account. For example, if the user requests a change of account logon credentials, a change of the email account, a change of the phone number, or any other change in user contact information. A risk behavior may be assigned to the case based on contact with account service personnel of the third party. For example, the customer service personnel may assign a high risk behavior rating to the account if the user fails to provide the correct answers to one or more user verification questions. A risk behavior rating may be assigned to the account if the user does not respond to a user verification text message sent to the UE 102 or the third party application.

A time weighted risk factor may be assigned as discussed in FIG. 3. The third party user account server may assign a time weighted risk factor with a high risk score that decreases over a time period. The time period and rate of decrease may depend on the change in risk behavior ratings. The risk factor assigned to the user account may be determined by the user activity, one or more risk behavior ratings, a time weighted risk factor, or any combination thereof.

The third party (e.g., financial institution 146) can compare the risk factor to a risk threshold, for example, in response to a customer request that requires user verification. The third party may use the risk factor for the particular user, e.g., customer, and use it alone or in conjunction with other authentication employed by the third party to determine the authenticity of the user, customer. When the risk factor is a low risk, the third party may use the user's device to verify the user's identity. When the risk rating is a medium risk, the third party may request a secondary method (i.e., a call to customer service) to verify the identity of the user. When risk rating is a high risk factor, the third party may freeze or otherwise prevent access to the user's account, log the user out of the account, and cancel pending transactions, and so on. Further, the third party can request the user directly contact the third party (e.g., financial institution 146) to verify the user's identity before reenabling the user's account access.

Figure 4:
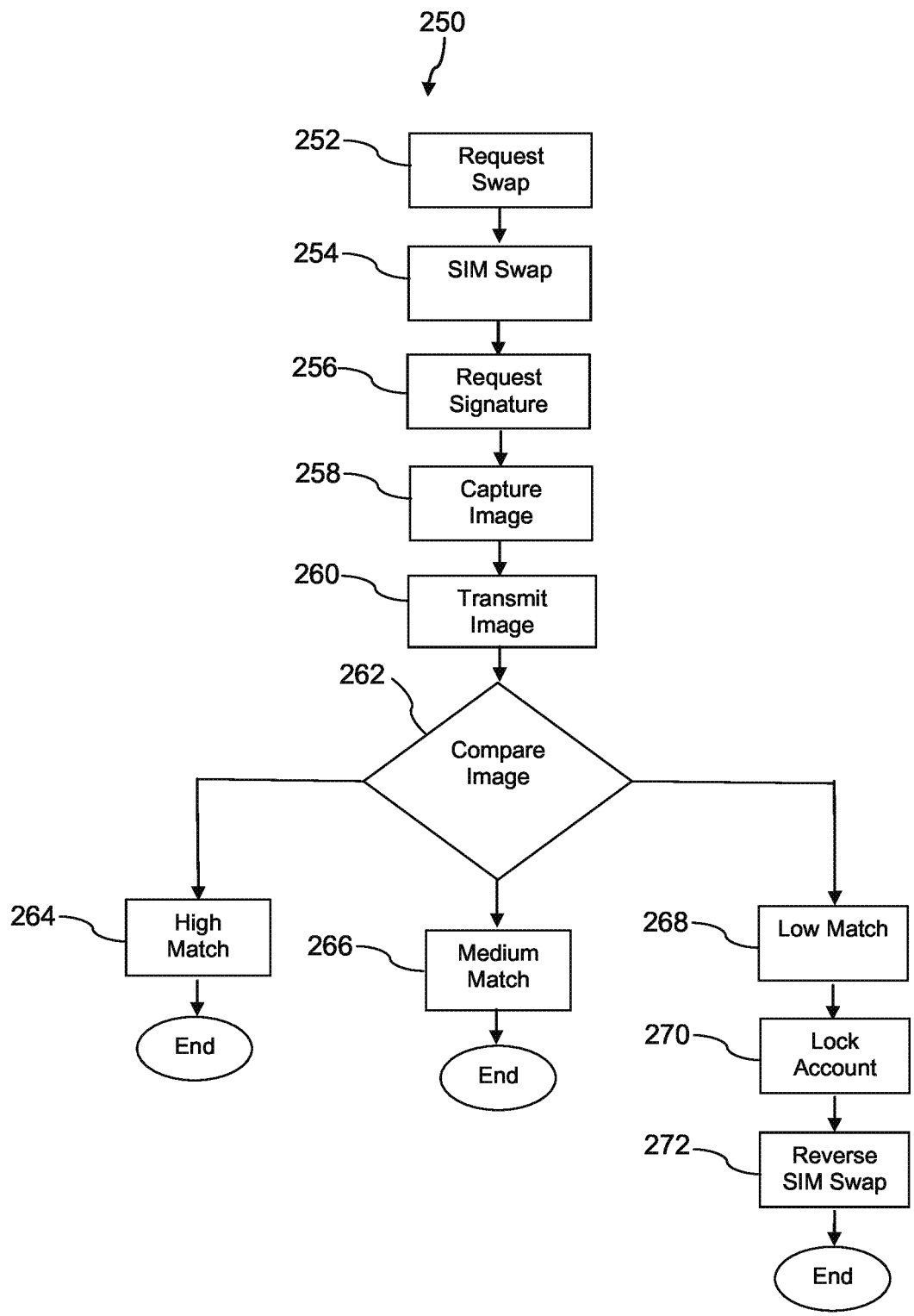
FIG. 4 is a logical flow diagram of a communication system according to an embodiment of the disclosure.

Turning now to FIG. 4 with reference to FIG. 1, a method 250 is now described with a logical flow diagram. As described in FIG. 2, in order to authenticate the user and the legitimacy of a SIM swap, the user may be requested to provide information, such as images, biometric information, etc. Because the biometric signature (e.g., images) may not be exact, the biometric signature may be evaluated to determine the accuracy of likelihood of the successful match. Steps 252 and 254 may comprise the SIM swap process and risk assessment and assignment described with regard to FIG. 2 above. At step 252, a user may log onto a self-service website 152 of a mobile carrier network 148 to request the SIM card 128 of the swap UE 122 be registered to the user's account 154 and SIM card 108 of the UE 102 is deregistered from the user account 154. At step 254, the mobile carrier network 148 deregisters the SIM card 108 of the UE 102 from the user account server 154 and registers the SIM card 128 of the swap UE 122 to the user account server 154. The mobile service server 156 then grants swap UE 122 access to the mobile carrier network 148.

At step 256, the user account server 154 can request a biometric signature be obtained from the authentication application (e.g., client application 132) executing on swap UE 122 to validate the SIM swap. The biometric signature can be an image of a user's face (i.e., a selfie), a part of a user's face (i.e., nose, chin, right eye, etc.), or another part of a user's body (i.e., fingerprint, hand print, left hand, right hand, etc.). The request for the biometric signature can identify the location or type of image used for comparison.

At step 258, the user obtains the biometric signature with the authentication application on swap UE 122. At step 260, the authentication application encrypts the image (e.g., photograph) and transmits the image to the user account server 154. In an embodiment, the authentication application (e.g., client application 132) hashes the image to create a fixed value. The term hashing refers to a hash function that creates a fixed-length value based on a message string or image.

At step 262, the user account server 154 can compare the image or the image hash with an authorized signature image (e.g., a previously submitted image). Alternatively, the mobile carrier can assign a risk factor based on selecting the correct selfie location (i.e., fingerprint from the left hand) in addition to the comparison of the image sent to the image on file. The user account server 154 can determine an image match range based on the comparison. The image match range may be a strong match, medium match, or a low match.

At step 264, the encrypted image or hash image has a strong match to the image on file. The user account server 154 may assign a low-risk rating for the SIM swap. The low-risk rating may be recorded in the user account server 154.

At step 266, the encrypted image or hash image has a medium or 50% match to the image on file. The user account server 154 may assign a medium risk rating for the SIM swap and request a second verification method, such as contacting a customer support agent on the phone or in person at a retail location.

At step 268, the encrypted image or hash image has a low match or does not match the image on file. The user account server 154 may assign a high risk rating for the SIM swap. At step 270, the user account server 154 may lock the user account, and disable the user account features, preventing the user from logging in to the user self-service website 152. The user may remain locked out of their account until they speak with a customer service representative. In an embodiment, the customer service representative may call the UE 102 device.

At step 272, the user account server 154 reverses the SIM swap. For example, the user account server 154 deregister the SIM card 128 of the swap UE 122 from the user account server 154 and register the SIM card 108 of the UE 102 to the user account server 154. The mobile service server 156 may grant UE 102 full access to the mobile carrier network 148. Deregistration blocks the swap UE 122 from access to the mobile carrier network 148.

In an embodiment, a financial institution 146 may request a biometric signature from authentication application (e.g., client application 132) executing on swap UE 122 to validate the user identity for a pending transaction or user request. For example, the user may request a change to the user account credentials or a financial transaction that the financial institution 146 determines to be high risk. The financial institution 146 may request a biometric signature from authentication application or from a user application provided by the financial institution 146. The authentication application may capture an image, encrypt the image, and transmit the image to mobile carrier network 148, where the user account 154 determines whether the biometric data matches that on file and can report back to the financial institution 146 a risk rating based on the match of the biometric image. The financial institution 146 can compare the risk rating to a risk threshold based on the sensitivity of the transaction. The pending transaction can proceed for a low-risk rating. The financial institution can request a secondary verification for a medium risk factor. The financial institution can deny the request based on a high-risk rating.

Figure 5A:
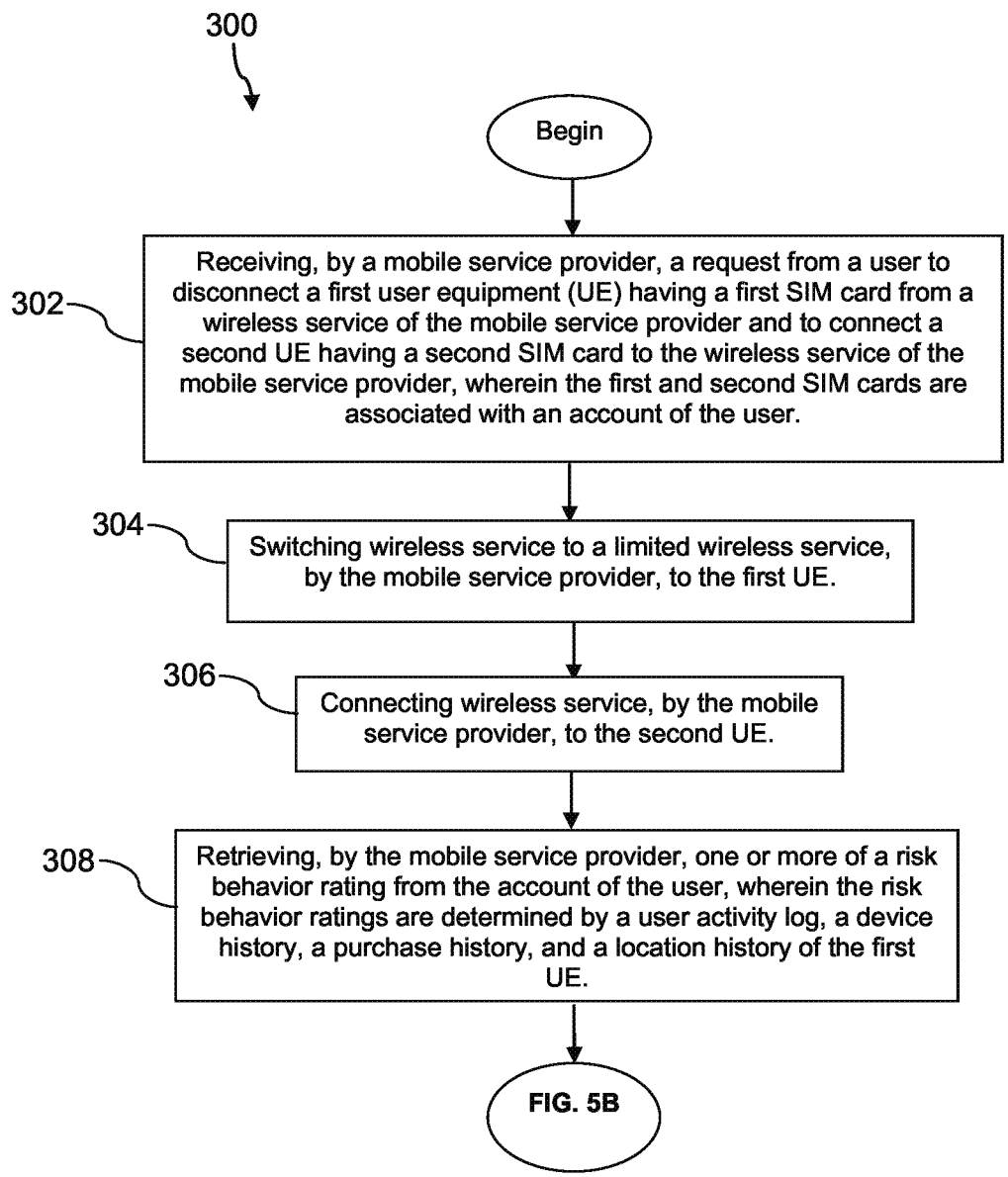
FIGS. 5A and 5B are a flow chart of a method according to an embodiment of the disclosure.

Turning now to FIG. 5A, a method 300 is described. In an embodiment, the method of provisioning a Subscriber Identity Module (SIM) swap. At step 302, the method 300 comprises receiving, by a mobile service provider, a request from a user to disconnect a first user equipment (UE) having a first SIM card from a wireless service of the mobile service provider and to connect a second UE having a second SIM card to the wireless service of the mobile service provider, wherein the first and second SIM cards are associated with an account of the user.

At step 304, the method 300 comprises switching wireless service to a limited wireless service, by the mobile service provider, to the first UE. At step 306, connecting wireless service, by the mobile service provider, to the second UE. At step 308, retrieving, by the mobile service provider, one or more of a risk behavior rating from the account of the user, wherein the risk behavior ratings are determined by a user activity log, a device history, a purchase history, and a location history of the first UE.

Figure 5B:
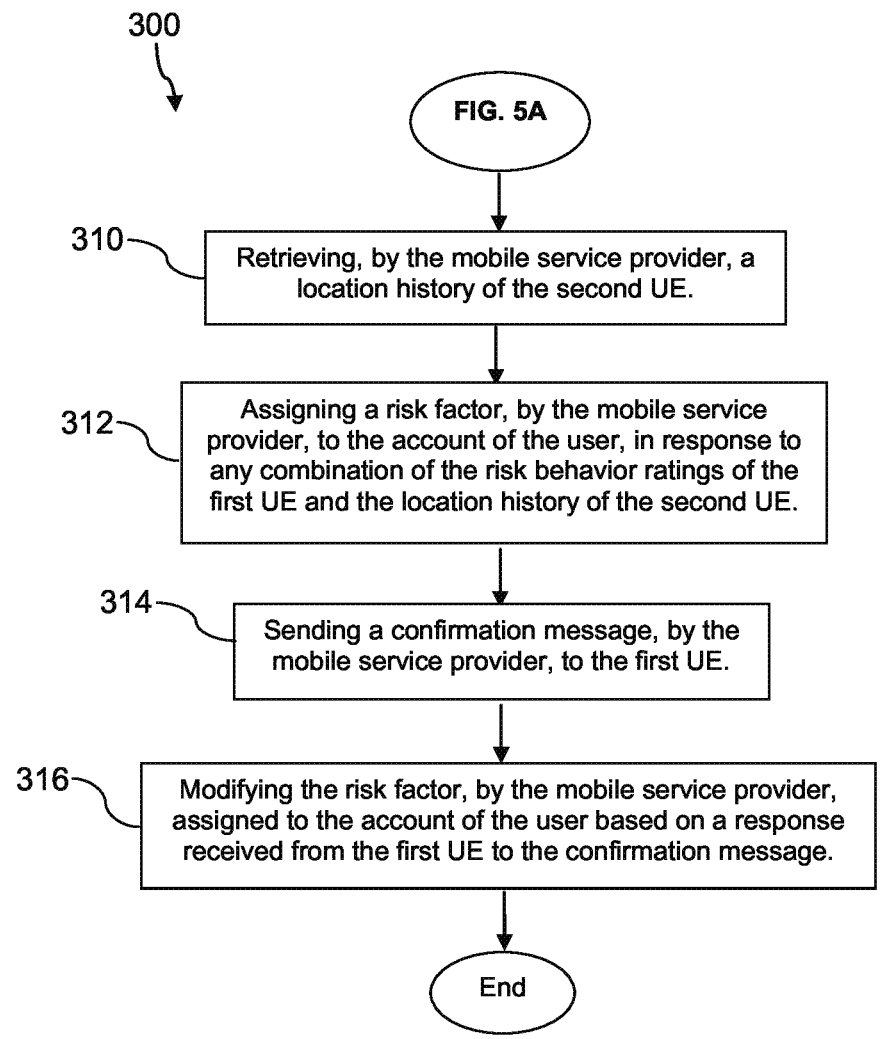

Turning now to FIG. 5B (which is a continuation of FIG. 5A), the flow chart continues. At step 310, the method 300 comprises retrieving, by the mobile service provider, a location history of the second UE. At step 312, the method 300 comprises assigning a risk factor, by the mobile service provider, to the account of the user, in response to any combination of the risk behavior ratings of the first UE and the location history of the second UE. At step 314, the method 300 comprises sending a confirmation message, by the mobile service provider, to the first UE. At step 316, the method 300 comprises modifying the risk factor, by the mobile service provider, assigned to the account of the user based on a response received from the first UE to the confirmation message.

Figure 6:
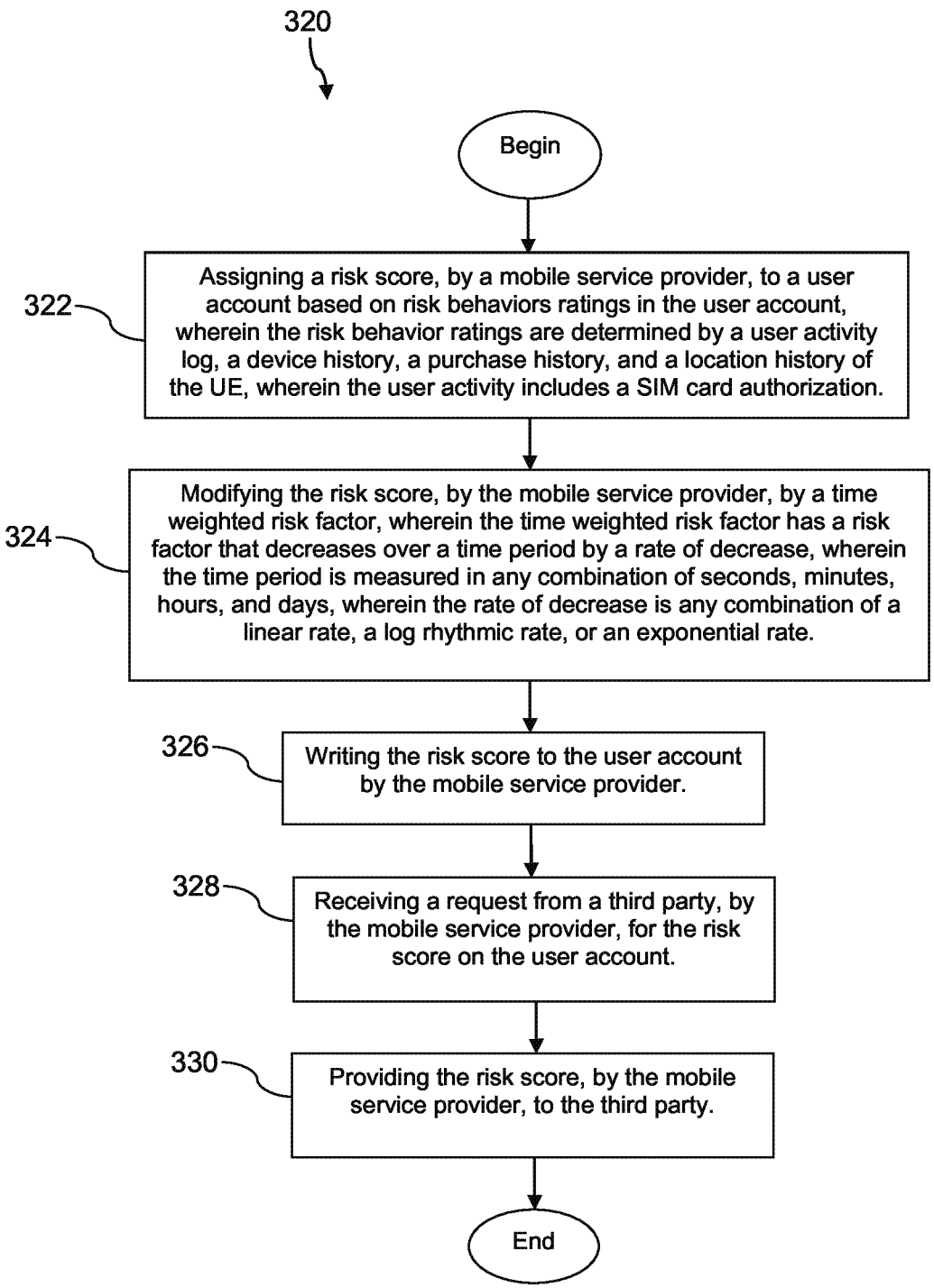
FIG. 6 is a flow chart of another method according to an embodiment of the disclosure.

Turning now to FIG. 6, a method 320 is described. In an embodiment, the method of assigning a time weighted risk score for user authentication by a UE. At step 322, the method 320 comprises assigning a risk score, by a mobile service provider, to a user account based on risk behaviors ratings in the user account, wherein the risk behavior ratings are determined by a user activity log, a device history, a purchase history, and a location history of the UE, wherein the user activity includes a SIM card authorization. At step 324, the method 320 comprises modifying the risk score, by the mobile service provider, by a time weighted risk factor, wherein the time weighted risk factor has a risk factor that decreases over a time period by a rate of decrease, wherein the time period is measured in any combination of seconds, minutes, hours, and days, wherein the rate of decrease is any combination of a linear rate, a log rhythmic rate, or an exponential rate. At step 326, the method 320 comprises writing the risk score to the user account by the mobile service provider. At step 328, the method 330 comprises receiving a request from a third party, by the mobile service provider, for the risk score on the user account. At step 330, the method 320 comprises providing the risk score, by the mobile service provider, to the third party.

Figure 7:
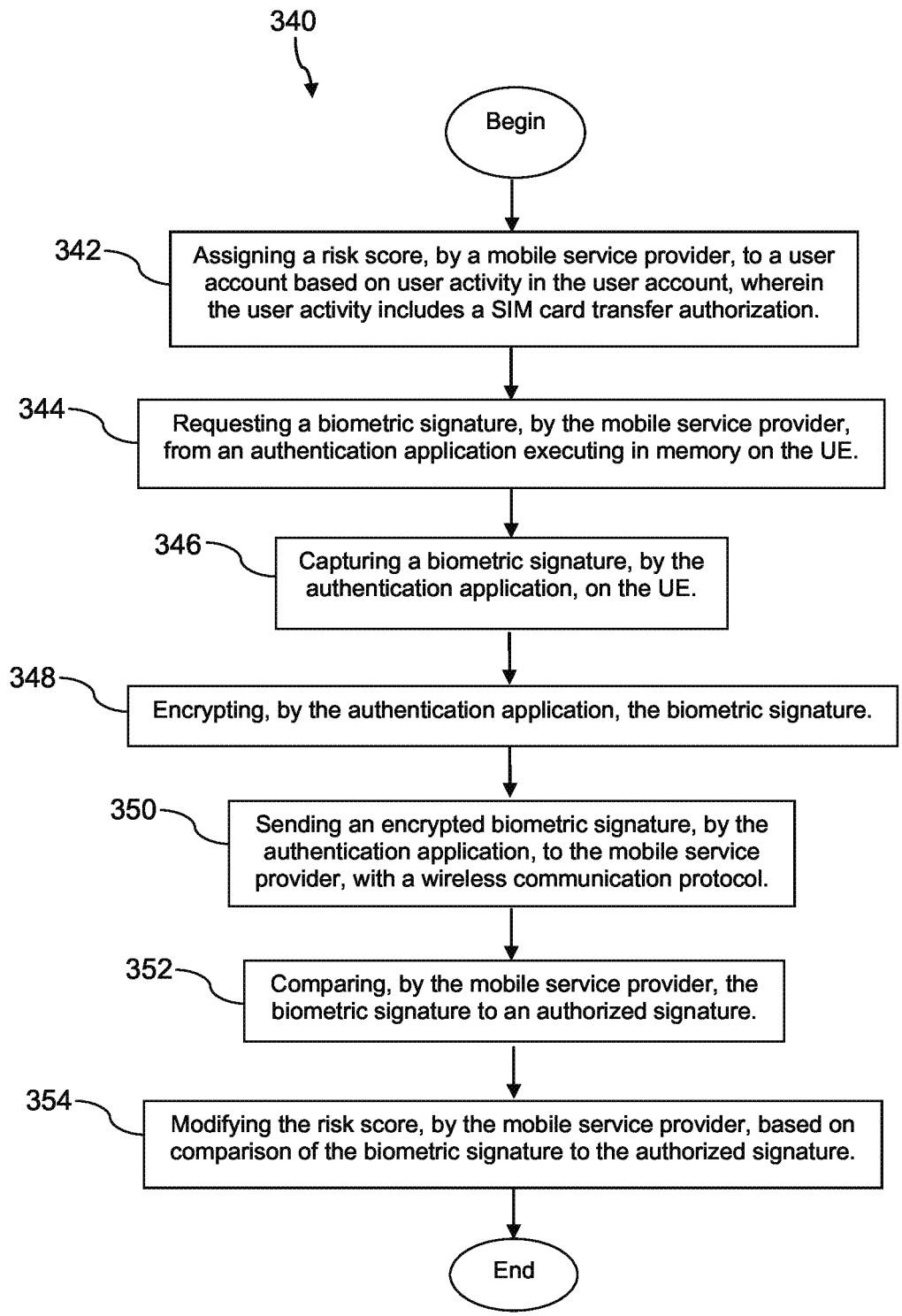
FIG. 7 is a flow chart of yet another method according to an embodiment of the disclosure.

Turning now to FIG. 7, a method 340 is described. In an embodiment, the method 340 is a method of authenticating a user request for a Subscriber Identity Module (SIM) card transfer by a biometric signature from a UE. At step 342, the method 340 comprises assigning a risk score, by a mobile service provider, to a user account based on user activity in the user account, wherein the user activity includes a SIM card transfer authorization.

At step 344, the method 340 comprises requesting a biometric signature, by the mobile service provider, from an authentication application executing in memory on the UE. At step 346, the method 340 comprises capturing a biometric signature, by the authentication application, on the UE. At step 348, the method 340 comprises encrypting, by the authentication application, the biometric signature.

At step 350, the method 340 comprises sending an encrypted biometric signature, by the authentication application, to the mobile service provider, with a wireless communication protocol. At step 352, the method 340 comprises comparing, by the mobile service provider, the biometric signature to an authorized signature. At step 354, the method 340 comprises modifying the risk score, by the mobile service provider, based on comparison of the biometric signature to the authorized signature.

Figure 8:
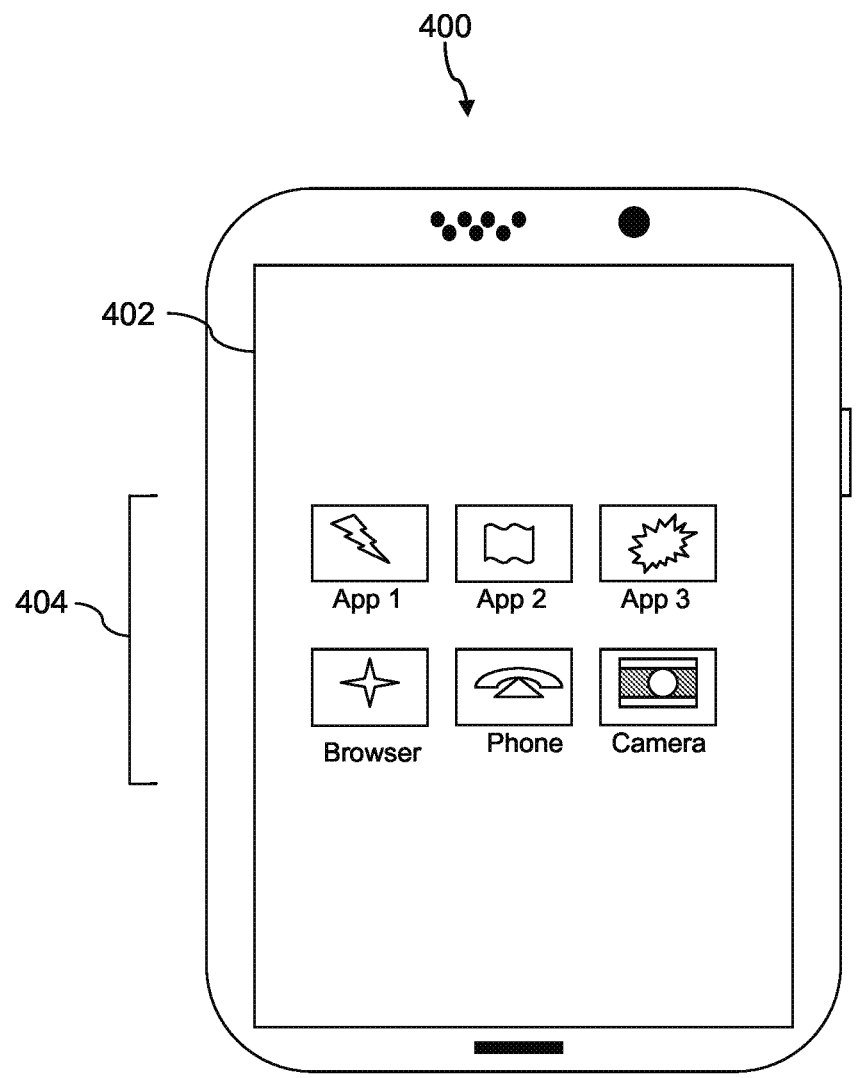
FIG. 8 is an illustration of a mobile communication device according to an embodiment of the disclosure.

FIG. 8 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400, or any other wireless communication network or system.

Figure 9:
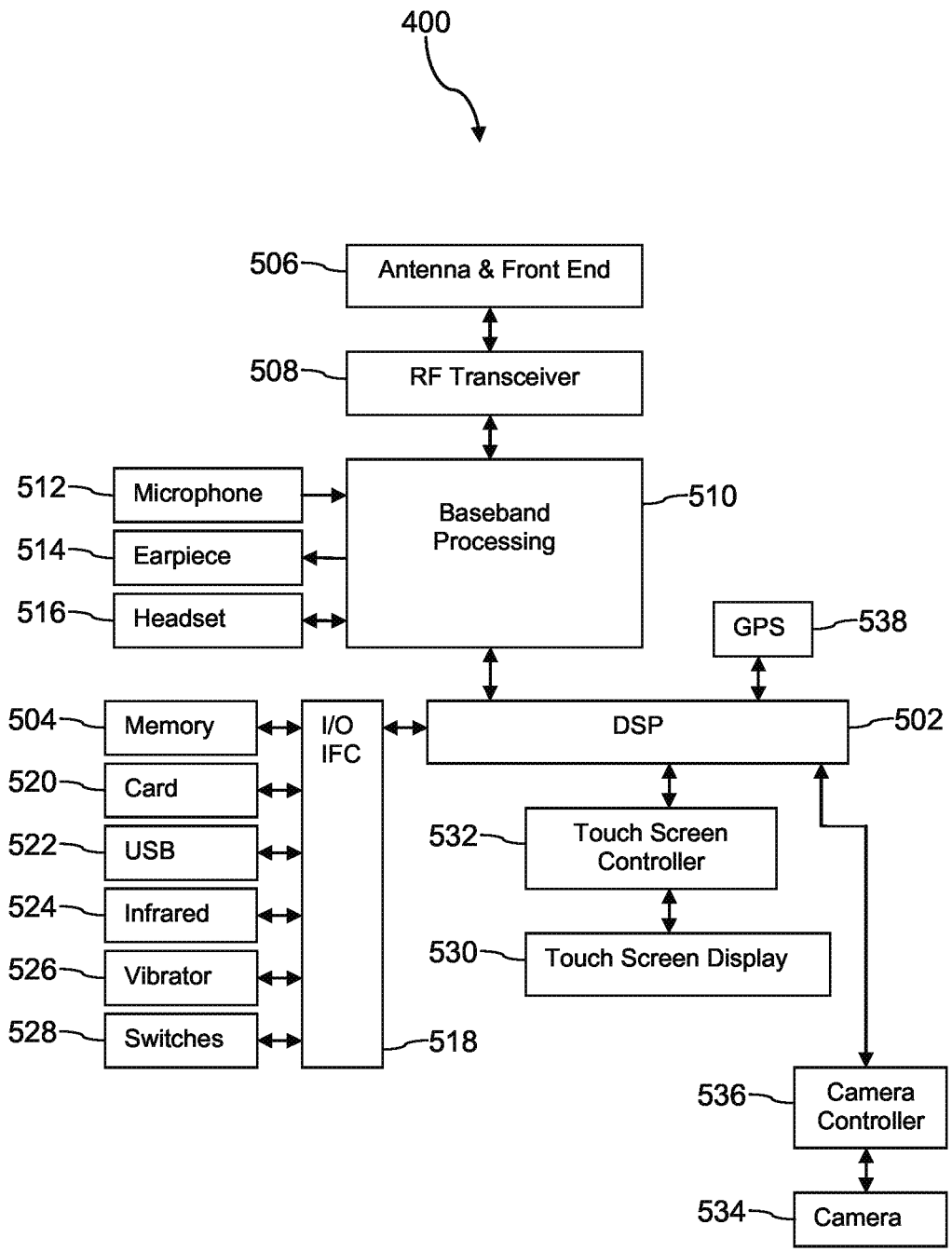
FIG. 9 is a block diagram of a hardware architecture of a mobile communication device according to an embodiment of the disclosure.

FIG. 9 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 10A:
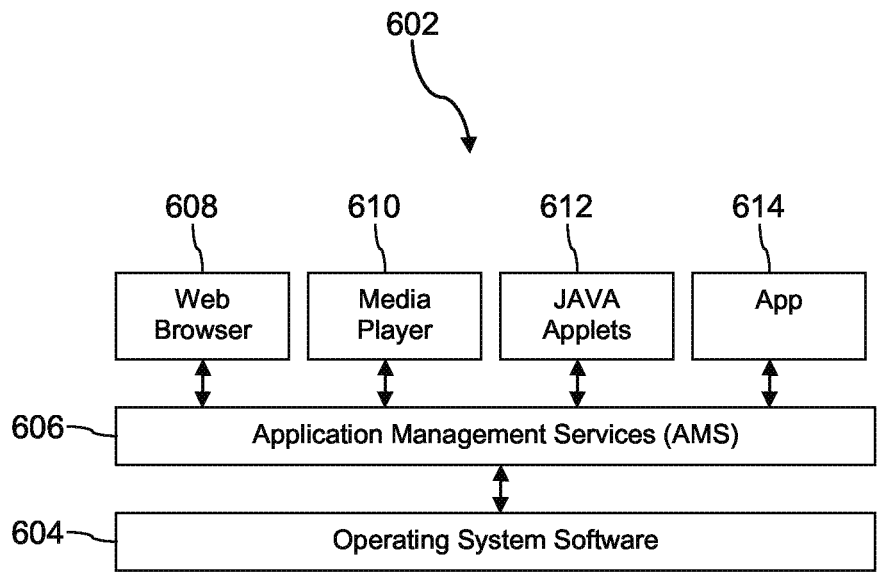
FIG. 10A is a block diagram of a software architecture of a mobile communication device according to an embodiment of the disclosure.

FIG. 10A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 10A are a web browser application 608, a media player application 610, JAVA applets 612, and other applications 614. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 10B:
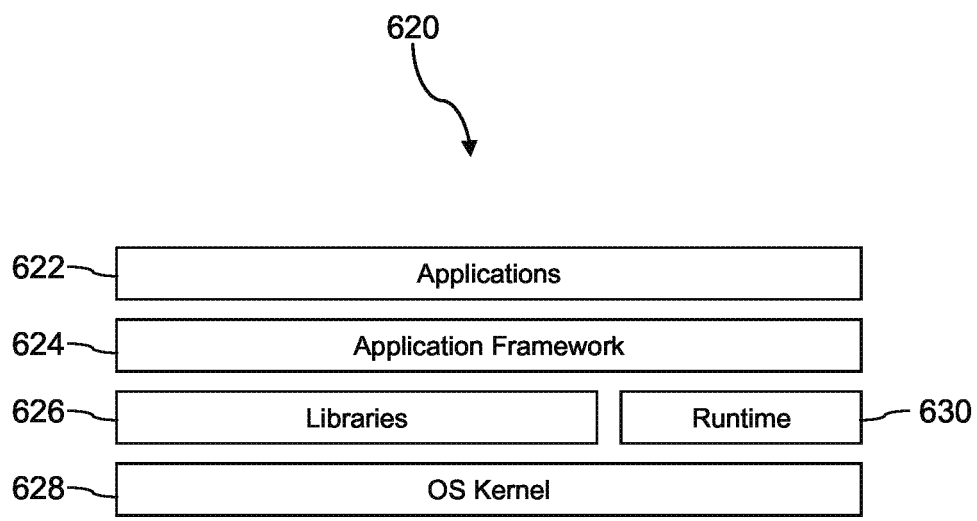
FIG. 10B is a block diagram of another software architecture of a mobile communication device according to an embodiment of the disclosure.

FIG. 10B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 11:
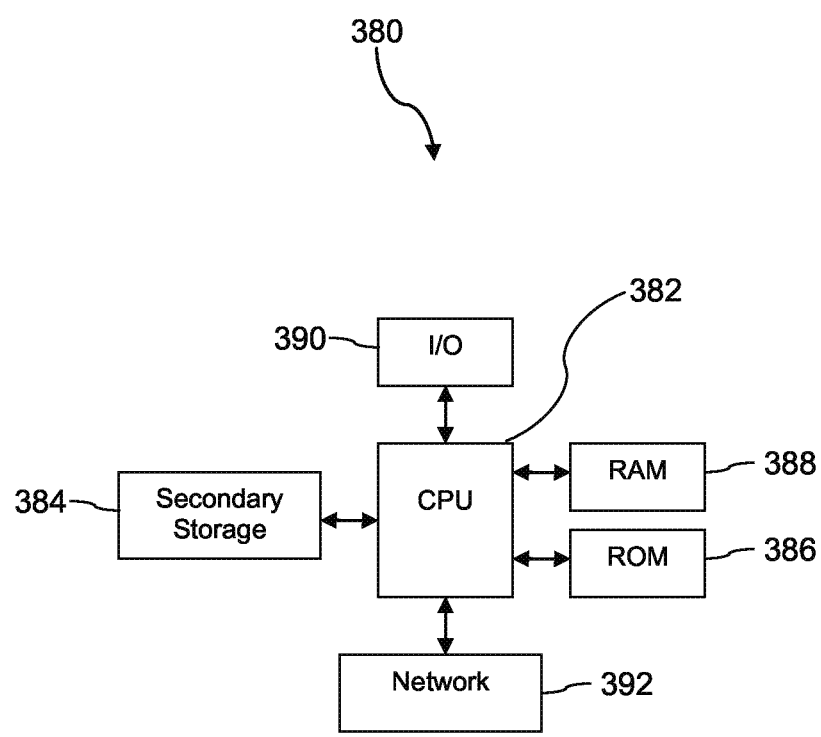
FIG. 11 is a block diagram of a computer system according to an embodiment of the disclosure.

FIG. 11 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of assigning a time weighted risk score for user authentication by a user equipment (UE), comprising:
   assign a risk score to a user account based on risk behaviors ratings in the user account, wherein the risk behavior ratings are determined by a user activity log, a device history, a purchase history, and a location history of the UE, wherein the user activity includes a Subscriber Identity Module (SIM) card authorization;
   modifying the risk score, by the mobile service provider, by a time weighted risk factor, wherein the time weighted risk factor has a risk factor that decreases over a time period by a rate of decrease, wherein the time period is measured in any combination of seconds, minutes, hours, and days, and wherein the rate of decrease is any combination of a linear rate, a log rhythmic rate, or an exponential rate;
   writing the risk score to the user account by the mobile service provider;
   receiving a request from a third party, by the mobile service provider, for the risk score on the user account;
   providing the risk score, by the mobile service provider, to the third party;
   comparing the risk score, by the third party, to a risk threshold; and
   one of 1) cancelling user authorization to a user account of the third party, by the third party, in response to the risk score exceeding the risk threshold, or 2) authorizing, by the third party, access to the user account of the third party in response to the risk being equal to or less than the risk threshold.

2. The method of claim 1, wherein the user authorization relates to authorizing a financial transaction.

3. The method of claim 1, further comprises:
   establishing a communication session by a third party application executing on a remote server to the mobile service provider, wherein the remote server processes financial transactions; and
   receiving the risk score, by the third party application, from the user account by the mobile service provider.

4. The method of claim 1, wherein the third party is one of a financial institution, an insurance company, or an investment company.

5. The method of claim 1, wherein the request from the third party is by a third party application executing on the UE.

6. The method of claim 1, wherein the request from the third party is by a third party application executing on a remote server associated with the third party, and wherein the remote server processes financial transactions.

7. The method of claim 1, wherein the risk score is modified by the time weighted risk factor when a SIM swap is requested.

8. The method of claim 1, wherein the time weighted risk factor causes the risk score to decrease over the time period based the risk behaviors ratings.

9. The method of claim 1, further comprising taking action by the mobile service provider in response to the modified risk factor being above a threshold, wherein the action comprises at least one of denying a SIM swap on the second UE, reversing the SIM swap on the second UE, or locking the account of the user.

10. A system of assigning a time weighted risk score for user authentication by a user equipment (UE), comprising:
a user account server configured to:
assign a risk score to a user account based on risk behaviors ratings in the user account, wherein the risk behavior ratings are determined by a user activity log, a device history, a purchase history, and a location history of the UE, wherein the user activity includes a Subscriber Identity Module (SIM) card authorization;
modify the risk score by a time weighted risk factor, wherein the time weighted risk factor has a risk factor that decreases over a time period by a rate of decrease, wherein the time period is measured in any combination of seconds, minutes, hours, and days, and wherein the rate of decrease is any combination of a linear rate, a log rhythmic rate, or an exponential rate;
write the risk score to the user account;
receive a request from a third party for the risk score on the user account; and
provide the risk score to the third party, wherein the third-party compares the risk score to a risk threshold and one of 1) cancels user authorization to a user account of the third party in response to the risk score exceeding the risk threshold, or 2) authorizes access to the user account of the third party in response to the risk being equal to or less than the risk threshold.

11. The system of claim 10, wherein the user authorization relates to authorizing a financial transaction.

12. The system of claim 10, wherein a communication session is established between a third party application executing on a remote server and the user account server, wherein the remote server processes financial transactions, and wherein the risk score is received by the third party application from the user account server.

13. The system of claim 10, wherein the third party is one of a financial institution, an insurance company, or an investment company.

14. The system of claim 10, wherein the request from the third party is by a third party application executing on the UE.

15. The system of claim 10, wherein the request from the third party is by a third party application executing on a remote server associated with the third party, and wherein the remote server processes financial transactions.

16. The system of claim 10, wherein the risk score is modified by the time weighted risk factor when a SIM swap is requested.

17. The system of claim 10, wherein the time weighted risk factor causes the risk score to decrease over the time period based the risk behaviors ratings.

18. The system of claim 10, further comprising a database that stores the risk score.

* * * * *